B. PIERSON.
VALVE DEVICE.
APPLICATION FILED NOV. 2, 1909.
1,005,465.
Patented Oct. 10, 1911.
2 SHEETS—SHEET 1.
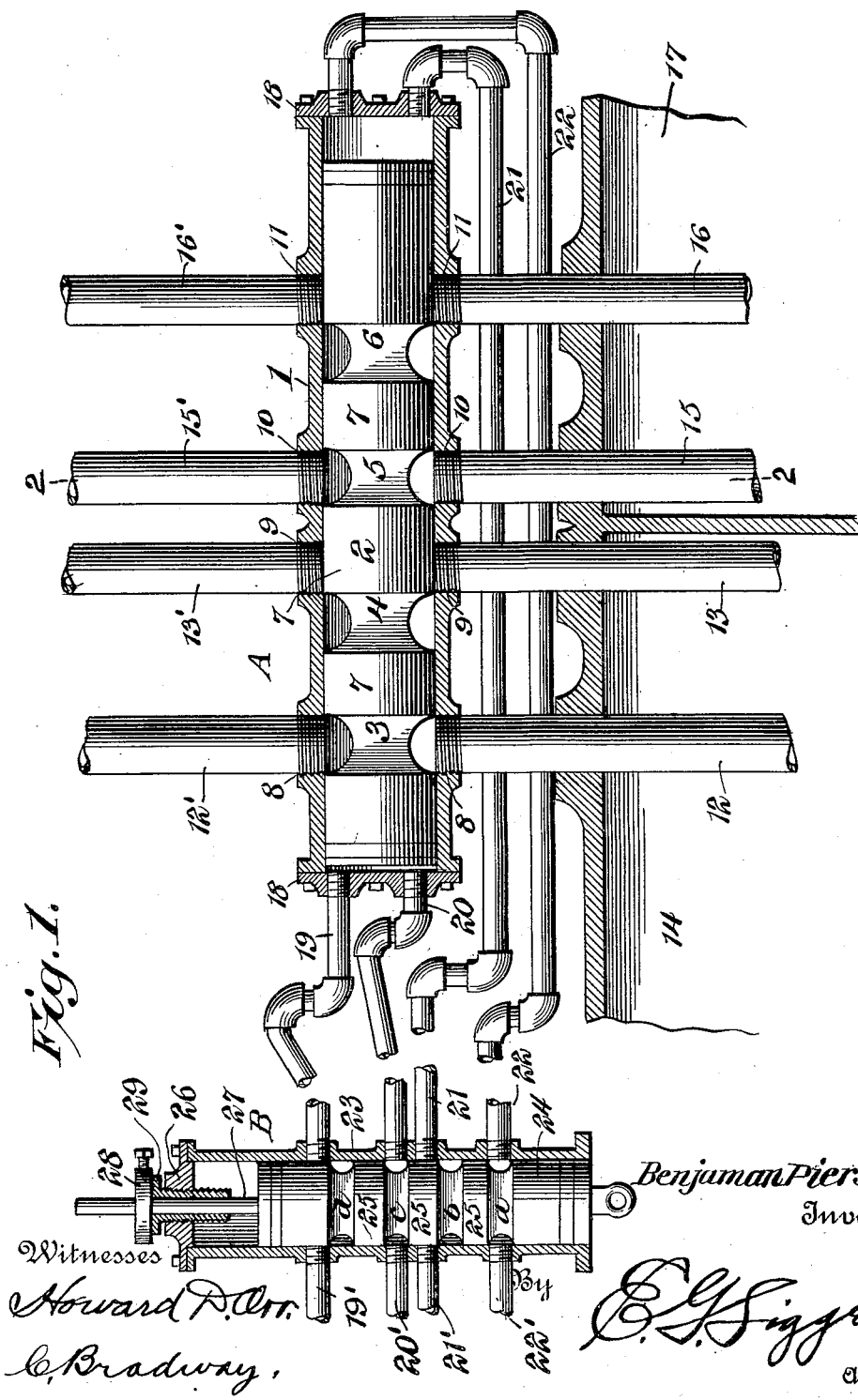

B. PIERSON.
VALVE DEVICE.
APPLICATION FILED NOV. 2, 1909.
1,005,465.
Patented Oct. 10, 1911.
2 SHEETS—SHEET 2.
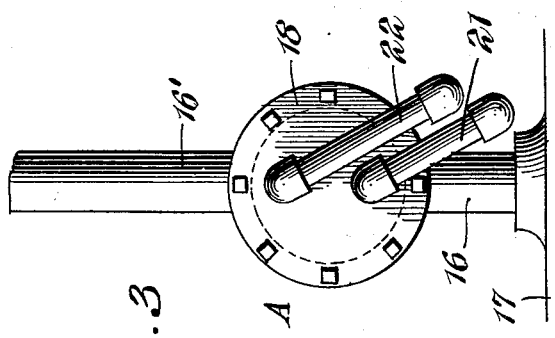
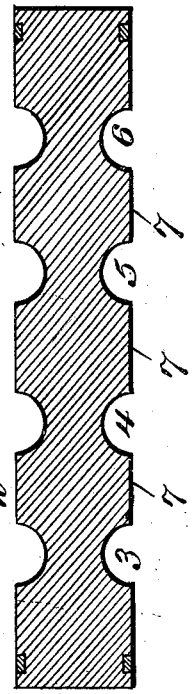
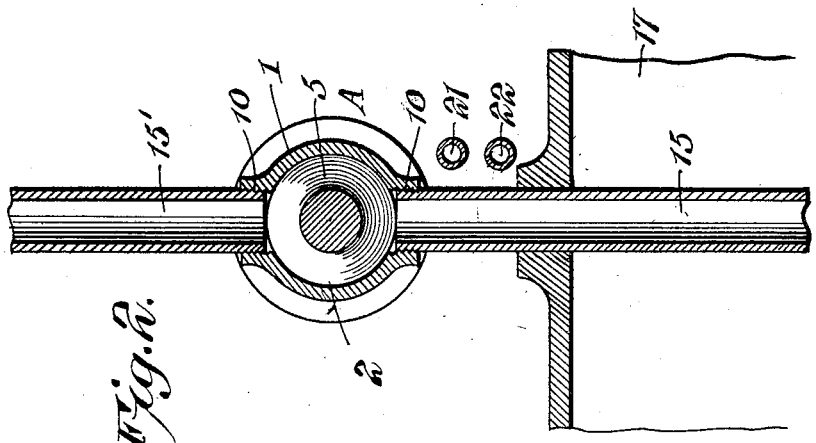
Witnesses
Howard D. Orr.
C. Bradway.
Benjaman Pierson, Inventor,
By E. G. Siggers
Attorney

UNITED STATES PATENT OFFICE.

BENJAMAN PIERSON, OF BOULDER, COLORADO.

VALVE DEVICE.

1,005,465.     Specification of Letters Patent.     Patented Oct. 10, 1911.

Application filed November 2, 1909. Serial No. 525,880.

*To all whom it may concern:*

Be it known that I, BENJAMAN PIERSON, a citizen of the United States, residing at Boulder, in the county of Boulder and State of Colorado, have invented a new and useful Valve Device, of which the following is a specification.

This invention relates to a valve for opening and closing tanks or other receptacles containing fluids whereby the inflow and discharge of the fluid are controlled, and is intended to be used more especially where fluid is discharged from one tank to another in the elevation of the fluid, according to the method set forth in my pending application Serial No. 482,296 on air and vacuum operated pumps, and while the invention is particularly adapted for this use, it may be employed in connection with other kinds of tanks, as in sugar factories where syrups and other heavy liquids are handled, or in cyanid mills for the mixing of a solution from one tank to another.

The invention has for one of its objects to provide simple and effective mechanism of this character which is reliable in use, readily controlled, and simple and inexpensive to manufacture.

Another object of the invention is the provision of a novel fluid controlling valve for tanks or other receptacles, which is actuated by fluid under pressure that is controlled by a master valve.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a central vertical section of the valve mechanism. Fig. 2 is a transverse section on line 2—2, Fig. 1. Fig. 3 is an end view. Fig. 4 is a longitudinal section of the ported piston of the fluid valve.

Similar reference characters are employed to designate corresponding parts throughout the views.

Referring to the drawings, A designates the main valve of the device that is employed in connection with one or more tanks for causing alternately the inflow of fluid to the tank and discharge therefrom by connecting the tank with a suction pump to create a vacuum to draw in the fluid and connecting the tank with the atmosphere during the outflow of the fluid from the tank. The valve A comprises a casing 1 of any desired length, according to the number of tanks to be employed, and this casing has an accurately finished cylindrical bore in which is a longitudinally-movable piston or follower 2 having a suitable arrangement of ports for connection with the pipes for establishing communication between the tank and the vacuum pump or atmosphere. In the present instance, the piston has annular or peripheral grooves 3, 4, 5 and 6, forming ports that are spaced apart, and the intervening portions 7 of the piston have a working fit with the bore of the cylinder 1 so as to prevent leakage from one port to another. The cylinder or casing 1 has four sets of diametrically disposed openings 8, 9, 10 and 11, which are so placed that two sets of the openings will register with two of the ports while the other ports will be out of register with the remaining openings. The bottom openings 8 and 9 are connected with pipes 12 and 13, respectively, and communicate with a tank, a portion of which is shown at 14, and the bottom openings 10 and 11 connect with pipes 15 and 16, respectively, that communicate with another tank, a portion of which is designated by 17. Connected with the upper openings are pipes 12', 13', 15' and 16', that coöperate with the lower pipes to form continuous conduits through the intervening ports of the piston. The pipe 12' may be connected with a vacuum pump and the pipe 13' open to the atmosphere, and when the valve or piston is in the position shown, a vacuum will be created in the tank 14 so as to cause fluid in the form of liquid, vapor or gas, as the case may be, to enter the tank, and as soon as the tank is filled, the piston may be automatically changed by any suitable mechanism to throw the port 3 out of register with the pipes 12 and 12' and throw the port 4 into register with the pipes 13 and 13', whereby the tank will be connected with the atmosphere so that the contents thereof can flow out through its discharge pipe (not shown). The same operation takes place in the tank 17 by moving the ports 5 and 6 into and out of register with their respective pipes 15, 15' and 16, 16'.

The ported piston 2 is actuated, preferably, by fluid pressure admitted to and exhausted from the cylinder by a master valve designated generally by B. The ends of the cylinder 1 are closed by heads 18 and the piston 2 is of less length than the cylinder so as to provide fluid chambers at the ends of the cylinder, into either of which fluid is admitted to move the piston longitudinally. Connected with one head are pipes 19 and 20, and to the other, pipes 21 and 22, which all lead to the valve B that controls the admission and exhaust of fluid to and from the end chambers of the cylinder A. The valve B consists of a cylindrical casing 23 in which is arranged a reciprocatory piston or valve body 24 that has annular ports $a$, $b$, $c$, $d$, separated by cylindrical portions 25 of the piston 24 which snugly fit in the casing 23. The ports $a$ and $d$ may be considered as compressed air supply ports and are arranged to register alternately with the pipes 22 and 19, and the ports $b$ and $c$ may be considered as vacuum or outlet ports that are adapted to alternately register with the pipes 21 and 20, respectively. Coöperating with the pipes between the cylinder 1 of the valve A and the valve B are pipes 19', 20', 21', 22'. The pipes 20' and 21' may be connected with a continuously-operating vacuum pump or equivalent means for exhausting the fluid from the cylinder 1, while the pipes 19' and 22' are connected with a compressed air pump or equivalent device for supplying fluid under pressure to the cylinder 1 for operating the piston therein. The piston 24 of the master valve can be manually or automatically operated, as desired, and as the piston of the master valve is reciprocated, the piston 2 of the tank-controlling valve A will be reciprocated, so that fluid will be alternately drawn into and discharged from the tank or tanks in regular succession. The cylinder 23 of the master valve is closed at its upper end by a head 26 through which projects a rod 27 on the upper end of the piston 24, and on this rod is a stop collar 28 which is adapted to strike an abutment 29 in the form of a sleeve threaded in the head 26, the inner end of the sleeve forming a stop with which the upper end of the piston 24 engages. The piston will thus have a reciprocatory movement which is limited to bring the ports $a$ and $c$ into register with their respective pipes when the piston is in one position, and the ports $b$ and $d$ into register with their respective pipes when the piston is in the other extreme position. When the piston 24 is in the position shown, the fluid under pressure is discharged through the pipe 22', port $a$, pipe 22 to the right end of the cylinder of the pipe-controlling valve A, so as to move the piston therein to the left, this movement being assisted by a vacuum being produced at the left end of the cylinder by the vacuum pump or suction device having communication through the pipe 20', port $c$, pipe 20, with the left end of the cylinder. When the piston 24 of the master valve is raised, fluid under pressure will be discharged into the left end of the cylinder of the valve A, through the pipe 19', port $d$ and pipe 19, and at the same time the air is exhausted from the right end of the cylinder through the pipe 21', port $b$ and pipe 21.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. A valve structure comprising a cylindrical casing having pairs of matching ports in diametrical relation one to the other, a piston or follower snugly fitting the interior of the casing and of less length than such interior of the casing and provided with annular grooves spaced apart a distance less than the distance between the ports controlled thereby to uncover but one of two related pairs of ports at a time, separate inlet and outlet ports at each end of the casing, and a controlling or master valve for the first named valve having pairs of matching diametrical ports connected to the respective ports at the ends of the casing of the first named valve, said master valve also having a piston or follower provided with annular grooves adapted to be moved into coincidence with diametrically disposed ports in the casing, said grooves being arranged in pairs to control pairs of diametrically disposed ports and spaced apart a distance less than the ports in the master valve casing controlled thereby to uncover but one of two related pairs of ports at a time, said master valve casing being freely open at one end and provided at the other end with a head with an adjustable sleeve or abutment therein, and the master valve piston having a manipulating rod extending through the sleeve and provided with an adjustable collar.

2. A valve structure comprising a suitable casing having ports therethrough, a reciprocable piston or follower of less length than the casing and provided with annular grooves movable by the piston into and out of operative relation to the respective ports, separate inlet and outlet means at each end of the casing, and means for the production of superatmospheric pressure at one end of the casing and of sub-atmospheric pressure at the other end of the casing simultaneously.

3. A valve structure comprising a suitable casing having diametrically arranged ports in spaced relation, a piston or follower within the casing of less length than the casing and provided with passages for related spaced ports and spaced apart a distance less than the related spaced ports controlled thereby to uncover but one set of related sets of ports at a time, conduits connected to each end of the casing, and a valve having means for the admission of fluid under pressure alternately to opposite ends of the casing, and means for the production of sub-atmospheric pressure at the opposite end of the casing simultaneously with the production of superatmospheric pressure at the first named end of the casing.

In testimony, that I claim the foregoing as my own, I have hereto affixed my signature in the presence of two witnesses.

BENJAMAN PIERSON.

Witnesses:
 HENRY STAATS,
 HAROLD P. MARTIN.

---

Copies of this patent may be obtained for five cents each, by addressing the "Commissioner of Patents, Washington, D. C."